Aug. 23, 1938.   L. J. GORAR   2,128,139
GUARD FOR DOORWAYS
Filed March 6, 1934   6 Sheets-Sheet 1
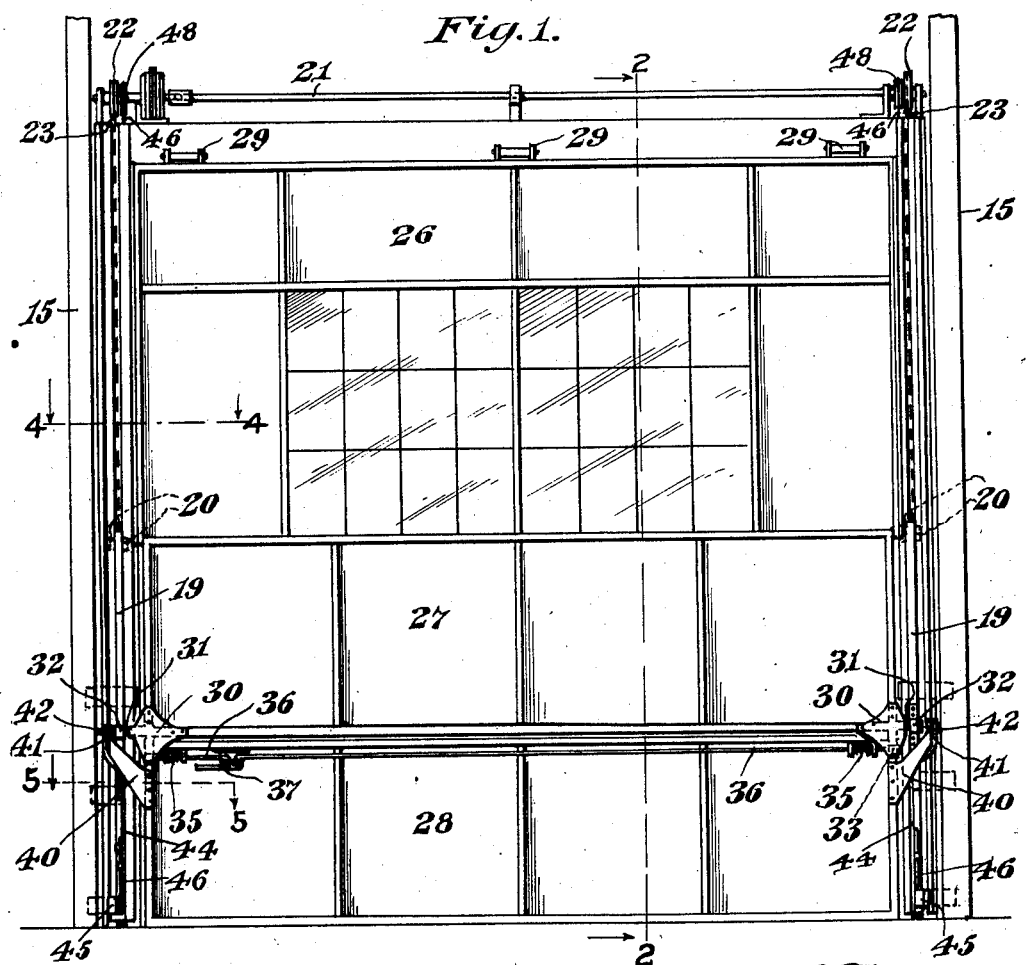
Inventor
Louis J. Gorar,
By
Attorney

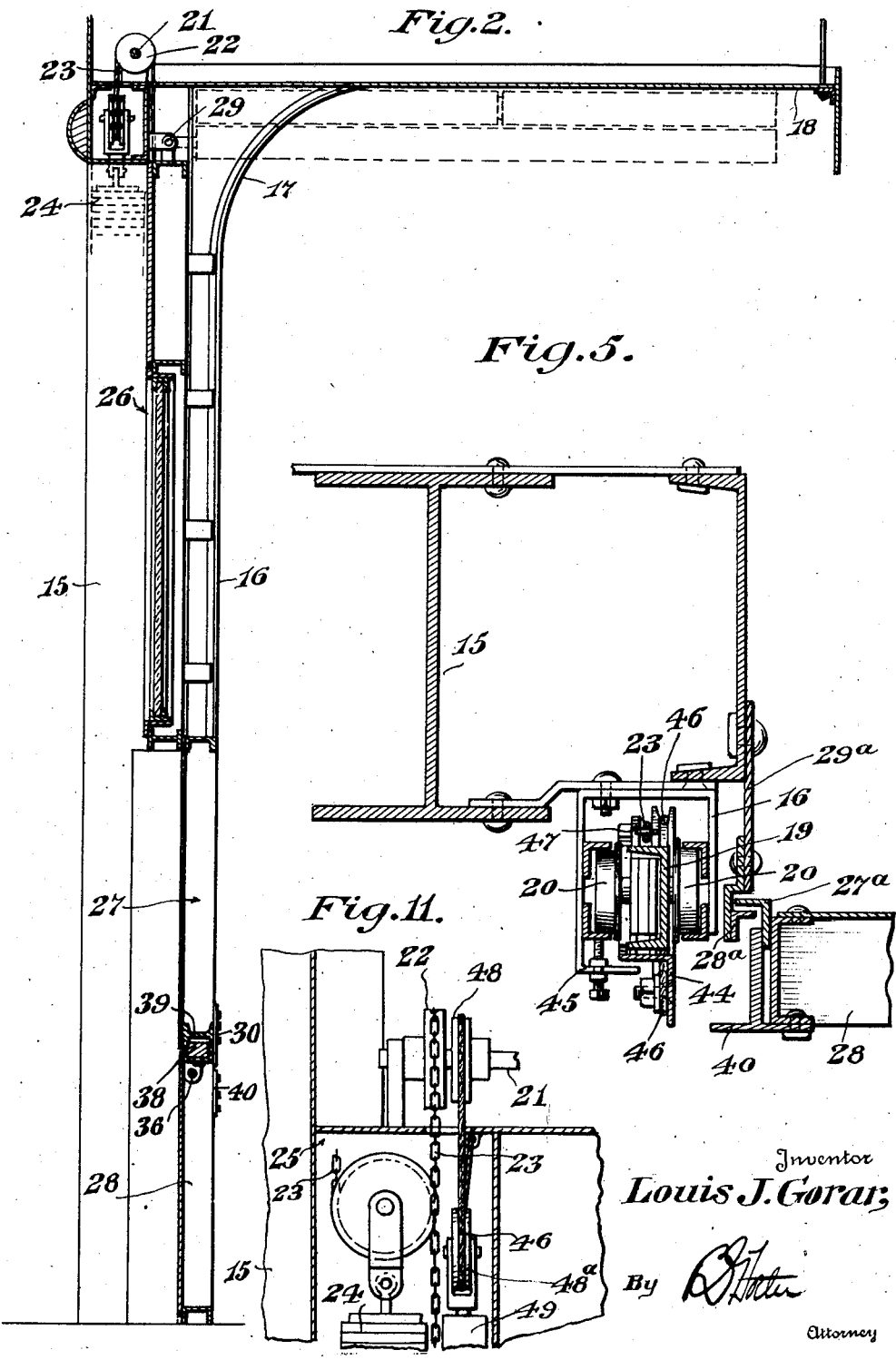

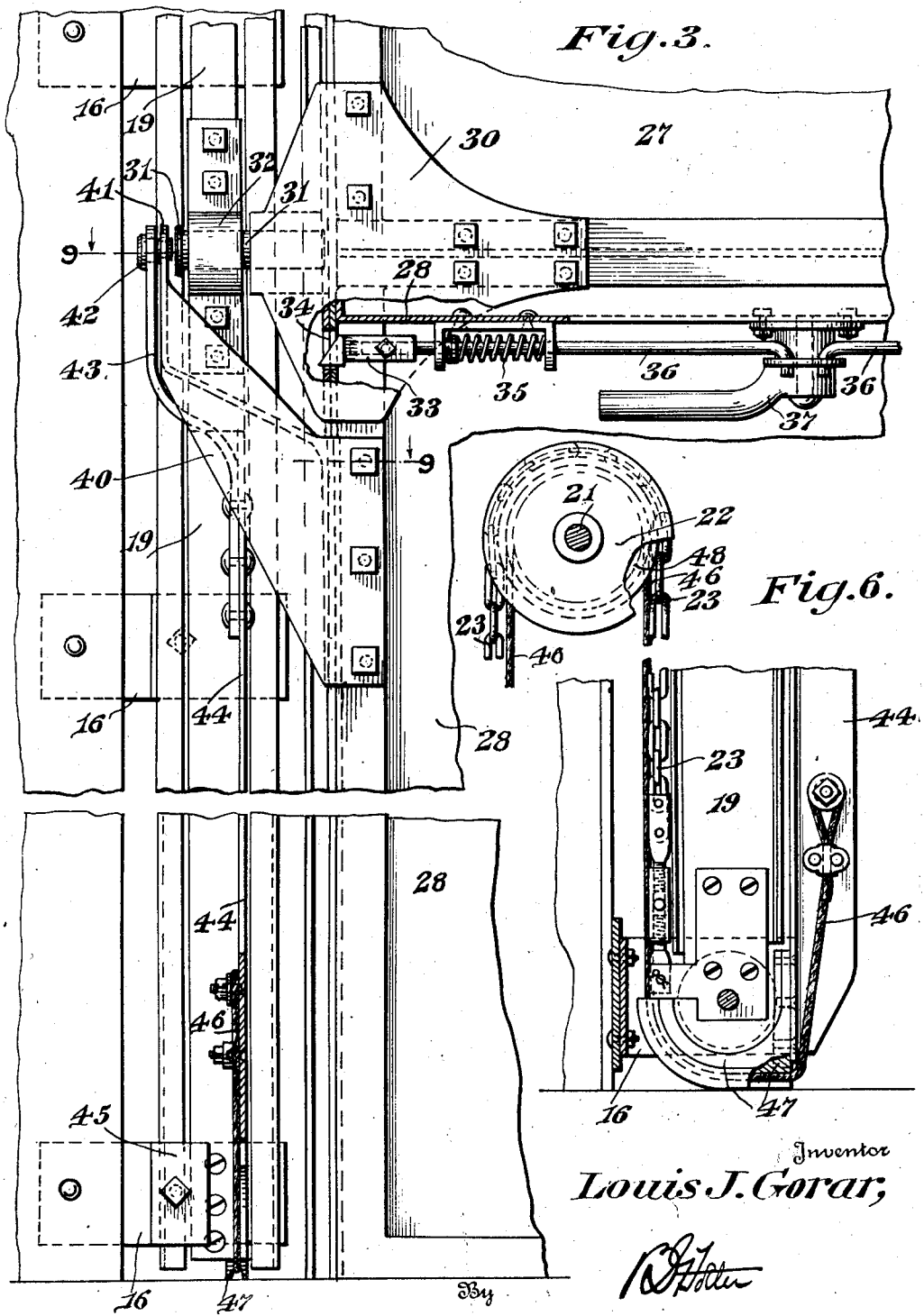

Aug. 23, 1938.　　　　L. J. GORAR　　　　2,128,139
GUARD FOR DOORWAYS
Filed March 6, 1934　　　　6 Sheets-Sheet 4
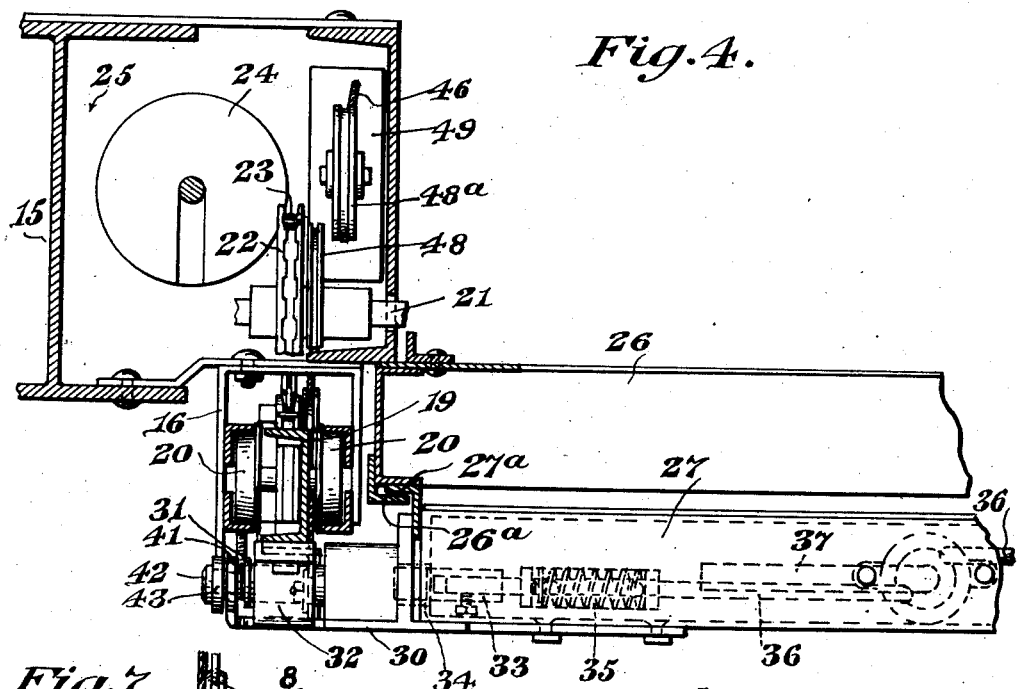
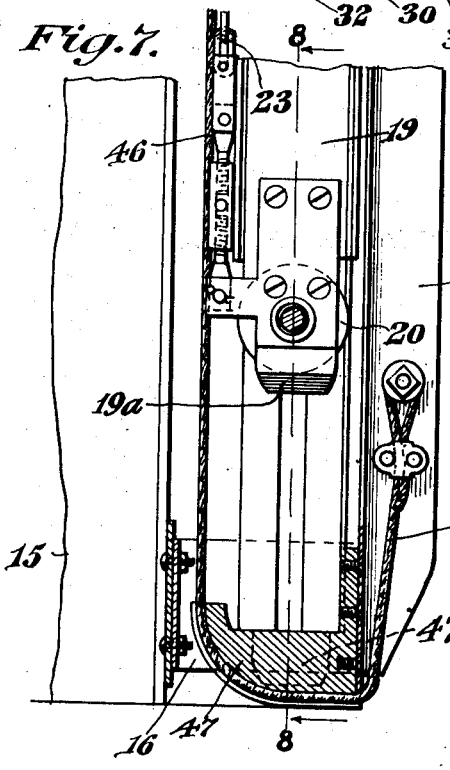
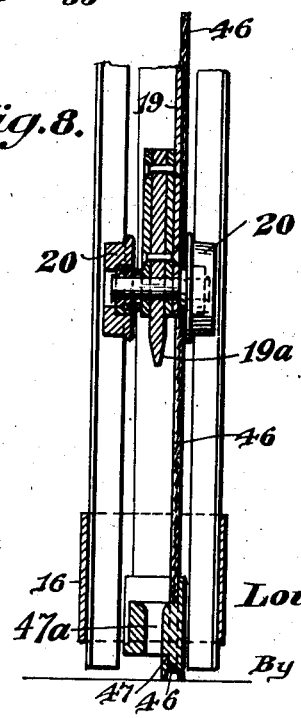
Inventor
Louis J. Gorar,
By
Attorney Aug. 23, 1938.     L. J. GORAR     2,128,139
GUARD FOR DOORWAYS
Filed March 6, 1934     6 Sheets-Sheet 5

Inventor
Louis J. Gorar,
Attorney

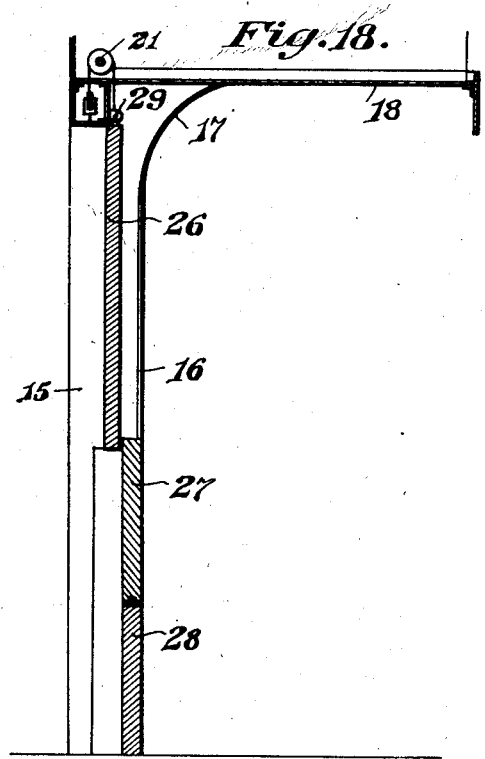
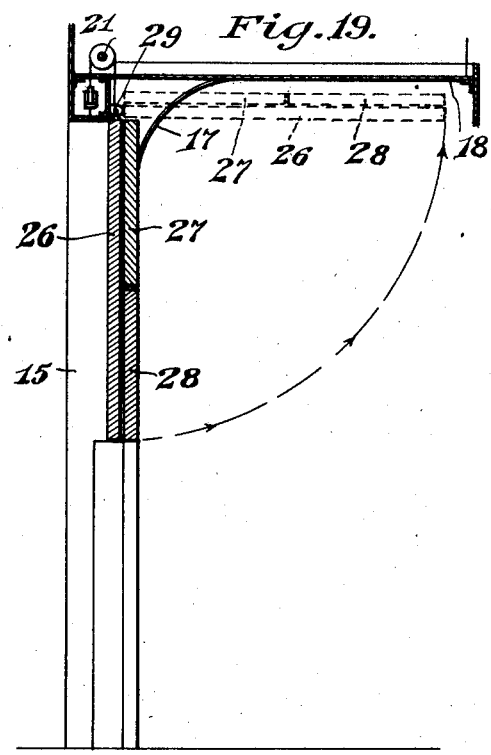
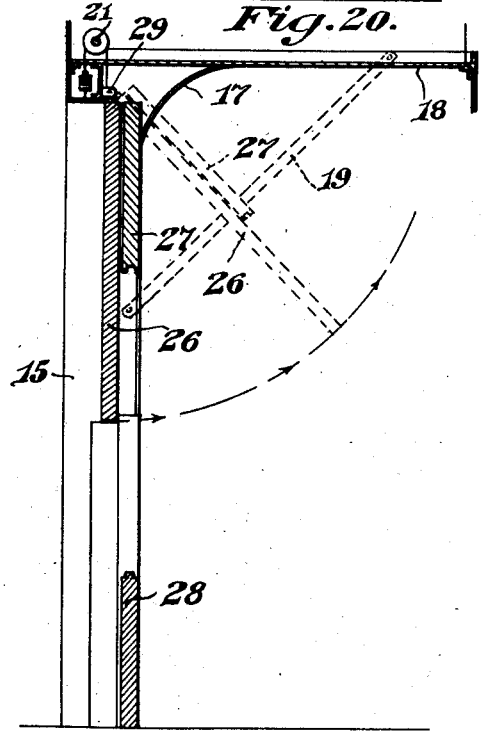
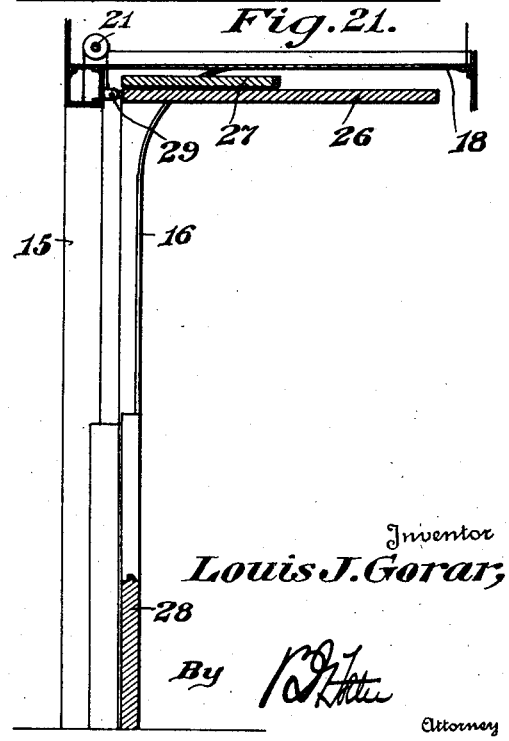

Patented Aug. 23, 1938

2,128,139

UNITED STATES PATENT OFFICE 2,128,139

GUARD FOR DOORWAYS

Louis J. Gorar, Brooklyn, N. Y., assignor to Truscon Steel Company, Youngstown, Ohio, a corporation of Michigan Application March 6, 1934, Serial No. 714,337

7 Claims. (Cl. 20—19)

In an application for patent filed by me on Oct. 23, 1933, Serial No. 694,896, there is disclosed a door structure specifically intended for ship piers, and in which a guard is provided that may be left across the lower part of the doorway while the remainder of the door is raised, thus providing a fence or barrier to prevent persons passing through the doorway, while giving them a view therethrough. In the specific embodiment of the invention disclosed in that application the structure is such that while the upper portion of the door may be partly opened when the barrier or guard is in place, said upper portion cannot be completely opened, so that the upper area of the doorway is still to a considerable extent obstructed.

One of the objects of the present invention is to provide a structure of the above character, but in which the guard or barrier can be left in position and the remainder of the door structure moved to a fully opened relation, thus with the exception of the barrier, leaving the doorway entirely free and unobstructed.

Another and important object is to provide connections that result in a more rigid lower leaf and to provide means whereby the lower leaf is better supported when being elevated as the counterweights are connected to the lower portion thereof.

An embodiment of the invention that is at present considered the prefrable one is illustrated in the accompanying drawings, wherein—

Figure 1 is an inside elevation of the door structure in its closed position.

Figure 2 is a vertical sectional view on the line 2—2 of Figure 1.

Figure 3 is an inside elevation on an enlarged scale of the lower portion of one side of the door and the associated guiding and operating means.

Figures 4 and 5 are sectional views taken respectively on the lines 4—4 and 5—5 of Figure 1.

Figure 6 is a detail side elevation of the lower end of one of the lifting levers and adjacent portion of one of the auxiliary guide arms.

Figure 7 is a view similar to Figure 6, but showing the lifting lever partially raised and the auxiliary arm remaining in lowered position.

Figure 8 is a vertical sectional view on the line 8—8 of Figure 7.

Figure 9 is a sectional view on the line 9—9 of Figure 3.

Figure 10 is a detail sectional view showing the right hand latch.

Figure 11 is a detail view illustrating part of the door elevating means.

Figure 12:
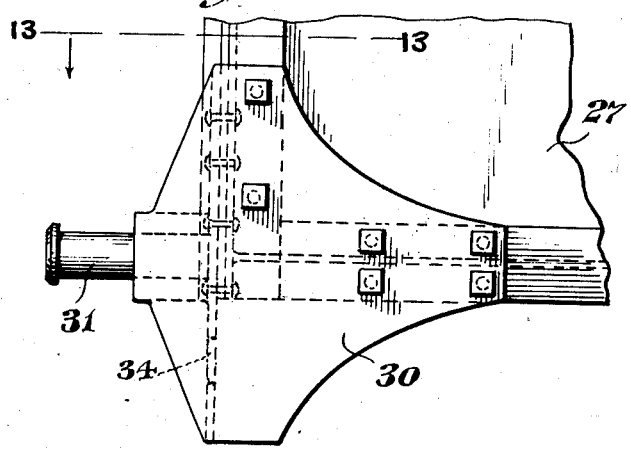

Figure 12 is a detail inside elevation of the left lower corner of the upper section of the lower leaf.

Figure 13:
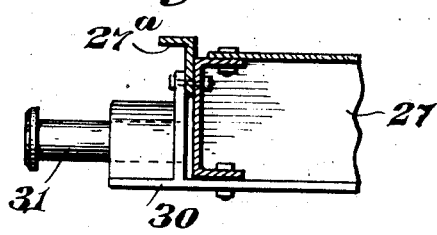

Figure 13 is a section on line 13—13 of Figure 12.

Figure 14:
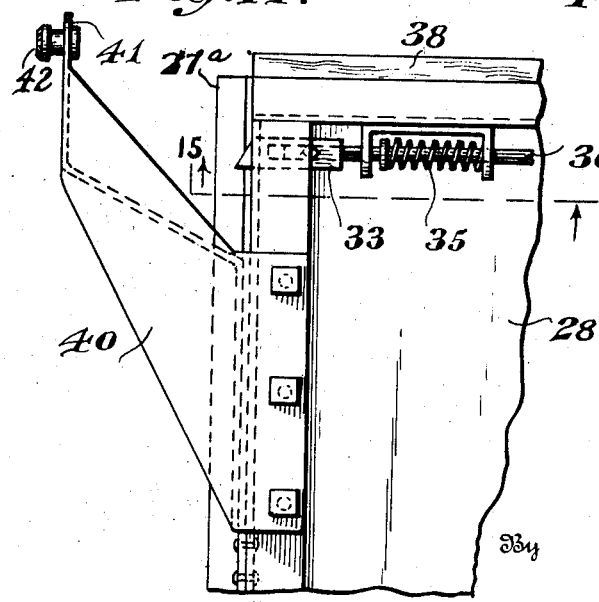

Figure 14 is a detail inside elevation of the upper left corner of the lower section of the lower leaf.

Figure 15:
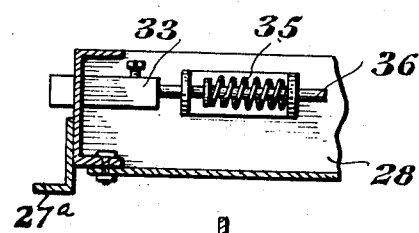

Figure 15 is a section on the line 15—15 of Figure 14.

Figure 16:
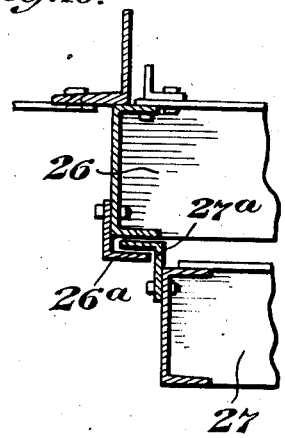

Figure 16 is a detail horizontal sectional view showing one of the guides on the top leaf for the sections of the lower leaf to slide in.

Figure 17:
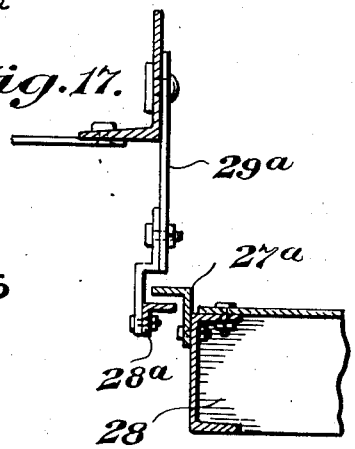

Figure 17 is a corresponding section through one of the guides for the lower leaf sections below the top leaf.

Figure 18 is a diagrammatic view illustrating the door fully closed.

Figure 19 is a similar view showing the lower leaf as a unit in elevated position.

Figure 20 is a view showing the lower section of the lower leaf acting as a barrier and the upper section raised.

Figure 21 shows the doorway completely opened except for the said barrier.

The door guiding and operating means of the present disclosure is substantially the same as that shown in the patent to Morgan, No. 1,789,189, issued January 13, 1931, and reference may be had thereto for the details of the structure. In the present embodiment the doorway is suitably framed at 15, and includes vertical guides 16 along its opposite sides. These guides, as shown in Figure 2, curve rearwardly at 17 at their upper ends and have substantially horizontal portions 18. Operating longitudinally of said guides are lifting levers in the form of channel bars 19 carrying at their ends rollers 20 that move in said guides. At the top of the doorway is suitable operating mechanism, which includes a shaft 21 having chain wheels 22 over which operate lifting chains 23 connected, as shown in Figures 6 and 7, to the lower ends of the lifting levers 19. The free ends of these chains support counterweights 24 operating in suitable boxes 25. This structure, as indicated above, is substantially the same as that of the patent to Morgan, No. 1,789,189.

For closing the doorway, a door is employed, which consists of an upper leaf 26 and a lower leaf, the latter comprising an upper section 27 and a lower section 28. The upper leaf 26 is pivotally mounted at its upper end as indicated at 29, and is adapted to swing upwardly and rearwardly. The two sections of the lower leaf are adapted to slide upwardly on the rear side of the upper leaf, guideways 26a being provided for the purposes, and the leaf sections having guide flanges 27a slidably engaged in said guideways. When so positioned, the lower leaf will swing with the upper leaf to a substantially horizontal position, thus leaving the entire doorway substantially unobstructed. This also is the arrangement provided for by the structure of the said patent to Morgan. When the lower leaf sections or either of them are in their lowered positions, the guide flanges 27a operate behind guides 28a carried by brackets 29a secured to the door frame 15 (see Figures 5 and 17).

Referring now particularly to the lower leaf, the two sections 27 and 28 thereof are separable, and the lower corners of the upper section 27 are provided with brackets 30 carrying outstanding trunnions 31 which are journaled in boxes 32 carried by the central portions of the lifting levers 19. Means are provided for detachably connecting the lower leaf section 28 to the upper leaf section 27. To accomplish this, and as particularly shown in Figures 1, 4 and 10, latch bolts 33 are mounted on the upper corner portions of the lower leaf section 28 and detachably engage in sockets 34 formed in downwardly extending portions of the brackets 30 (see Figures 10 and 12). These bolts 33 are projected by suitable springs 35 and have link connections 36 with an operating lever 37 mounted on the upper end of the lower leaf section. Obviously by turning the lever 37 in one direction, the bolts can be withdrawn, thus freeing the lower leaf section 28 from the upper leaf section 27, and when the lever is moved in the opposite direction, if the upper leaf section 27 is in its lowered position, the bolts will be projected and engaged in the sockets 34, thus securing together the two sections.

It will also be noted by reference to Figure 2 that the top of the lower leaf section 28 is provided with a hand rail 38, and that this is enclosed by the bottom frame bar 39 of the upper leaf section 27 when the latter is lowered.

Fixed to the upper corners of the lower leaf section 28 are outwardly and upwardly extending brackets 40 terminating in hinge ears 41. These ears are pivoted, as illustrated at 42, to upstanding outset brackets 43 carried by the upper ends of auxiliary guide arms 44 which operate alongside the lifting levers 19. The guide arms 44, as will be clear by reference to Figure 5, are preferably angle bars engaged behind guide pieces 45 forming part of the guideways 16. Secured to the lower ends of these arms are cables 46 which extend around curved guide blocks 47 secured to the lower ends of said arms, these cables passing upwardly around guide sheaves 48 loosely journaled on the operating shaft 21 and engaged with sheaves 48a from which are suspended counterweights 49. These counterweights, as shown in Figures 4 and 11, operate in the boxes 25 alongside the counterweights 24.

The guide blocks 47 are provided with sockets 47a for receiving the tongue elements 19a on the bottom of the lifting levers 19 so that when the sections 27 and 28 of the lower leaf are latched together the lower leaf 28 will be adequately interconnected with and supported by the lifting levers 19 to insure the latched sections moving together when the upper leaf 26 and the lower leaf comprising sections 27 and 28 are swung upwardly together as indicated by the dotted lines in Figure 19.

The operation of the structure is substantially as follows. When the door is completely lowered, as shown in Figures 1 and 18, the doorway is completely closed. If the door is to be completely opened, as in the provision for the structure shown in the aforesaid Morgan patent, No. 1,789,189, the lower leaf section 28 is latched to the upper leaf section. Hence when the operating shaft 21 is rotated, the lower leaf comprising both sections 27 and 28 is first elevated to a position behind the upper leaf 26 and then, due to the rearward movement of the lifting levers 19, both leaves are swung rearwardly and upwardly and to a horizontal open position as shown in Figure 19. These movements of the parts are permitted because the lower section has a pivotal mounting at 42, which is coaxial with the pivotal mounting at 31 of the upper section and therefore the two sections turn on this axis as a unit.

If now it is desired to obstruct the lower portion of the doorway, or in other words, to provide a guard against the passage of persons while leaving the upper portion entirely unobstructed, the latch bolts 33 are withdrawn, thus releasing the lower leaf section 28 from the upper leaf section. Under these conditions, if the operating shaft 21 is rotated in the proper direction, the upper leaf section 27 only is raised to a position behind the upper leaf 26 or to the position shown in Figure 20, and after being thus elevated, said section 27 and the leaf 26 can be turned upwardly and rearwardly, as indicated in Figure 21. The lower leaf section therefore is left as a guard or fence across the doorway. If it is desired to afterwards connect the sections 27 and 28, it is only necessary to move the upper leaf to its vertical position and either the section 27 may be lowered and latched to the section 28, or the section 28 can be raised and will automatically latch to the section 27, it being remembered that the section 28 is individually counterweighted, so that its elevation by hand can be readily accomplished.

From the foregoing, it is thought that the construction, operation and many advantages of the herein described invention will be apparent to those skilled in the art without further description, and it will be understood that various changes in the size, shape, proportion and minor details of construction may be resorted to without departing from the spirit or sacrificing any of the advantages of the invention.

What I claim, is:

1. In a combined door and guard, the combination with a door having an upwardly and downwardly swinging upper leaf and a lower leaf comprising upper and lower separable sections, of means pivotally connected to the upper section for raising it on the upper leaf and causing both to be swung, means for detachably connecting the sections of the lower leaf to cause both to be elevated and swing and to leave the lower section as a guard across the doorway, said upper section in the latter case being independently movable on the upper leaf and swinging therewith independently of the lower leaf, a pivotal mounting for the lower section, and a slidable member carrying said mounting.

2. The combination with a doorway, of a door and guard for the doorway comprising an upper leaf and a lower leaf, the latter having separable upper and lower sections, vertically movable and swinging lifting levers, guides at the doorway for the same, pivotal mountings on the lifting levers for the upper section of the lower leaf, means engaged with the levers for lifting and lowering the same, guide arms for the lower section movable alongside the shifting levers, pivotal mountings for the lower section on the guide arms, and means for detachably connecting the said upper and lower sections of the lower leaf.

3. The combination with a doorway, of a door and guard for the doorway, comprising an upper leaf and a lower leaf, the latter having separable upper and lower sections, vertically movable and swinging lifting levers, guides at the doorway for the same, pivotal mountings on the lifting levers for the upper section of the lower leaf, means engaged with the levers for lifting and lowering the same, guide arms for the lower section movable alongside the lifting levers, pivotal mountings for the lower section on the guide arms, the pivotal axes of the lower and upper sections being substantially coincident, and means for detachably latching together the top portion of the lower section to the lower portion of the upper section.

4. In combination with a doorway having vertical guideways along its sides, said guideways having rearwardly turned upper portions, of lifting levers mounted to move longitudinally in said guides between a lowered vertical and a substantially horizontal raised position, of a door for the doorway comprising an upper leaf and a lower leaf, the latter consisting of an upper section and a lower section, said upper section having pivotal mountings at its lower end pivoted on intermediate portions of the lifting lever, guide arms mounted in the guideways alongside the lifting levers, pivotal mountings for the upper end of the lower section on the guide arms and in substantial line with the pivotal mountings of the upper section, means for raising and lowering the lifting levers, counterweights for the lower section of the lower leaf connected to the guide arms, and a latch mechanism for detachably connecting the upper and lower sections of the lower leaf.

5. The combination with a doorway having guideways at its opposite sides, of lifting levers operating in tracks within the guideways, means connected to said levers for moving the same, an upper swinging door leaf, a lower door leaf connected to said lifting levers and slidable from a position below the upper leaf to a position alongside the same to swing therewith, said lower leaf comprising upper and lower separable sections, means for detachably connecting the lower section to the upper section, auxiliary guide arms also mounted in the guideways adjacent the lifting levers, brackets connecting the lower section and said guide arms, and counterbalance means for the lower leaf including flexible connections attached to the lower ends of the guide arms to permit the lower section to be easily raised and connected to the upper section when they are unlatched and separated.

6. The combination with a doorway, of a door leaf for the doorway including a lower guard section and a separable upper section, guide means at opposite sides of the doorway, lifting levers for the door leaf including both the upper and lower sections, said levers operating on tracks in the said guide means at opposite sides of the doorway, means for raising and lowering said levers, means for pivotally connecting the upper section to said levers, means for detachably connecting the guard section to the upper section to cause the two to move together or permit the guard section to remain across the doorway and the upper section to move to open position with the lifting levers, means connected to the guard section and partially located in said guide means for assisting in guiding the guard section in its sliding movement, cooperating elements on the lower ends of said lifting levers and the lower ends of the part of said means to be interengaged when the upper section and guard section are latched together for movement on the lifting levers.

7. The combination with a doorway, of a door leaf for the doorway including an upper section and a separable lower guard section, guide means at opposite sides of the doorway, lifting levers for the door leaf including both the upper and guard sections, said levers operating on tracks in the said guide means at opposite sides of the doorway, means for raising and lowering said levers, means for pivotally connecting the upper section to said levers, means for detachably connecting the guard section to the upper section to cause the two to move together or permit the guard section to remain across the doorway and permit the upper section to move to open position with the levers, means for supporting and bracing the guard section relative to said lifting levers when the sections are latched together, said means comprising auxiliary guide arms engaged with said guide means at opposite sides of the doorway, brackets carried by the guard section and connected to said guide arms, means carried by the lower end of the guide arms for receiving a portion of the lifting levers to interlock said guide arms with the levers, and counterbalance means for the guard section connected to the lower ends of said guide arms.

LOUIS J. GORAR.